(12) United States Patent
Kim et al.

(10) Patent No.: US 11,511,634 B2
(45) Date of Patent: Nov. 29, 2022

(54) CHARGING SYSTEM FOR ROBOT AND CONTROL METHOD THEREOF

(71) Applicant: LG ELECTRONICS INC., Seoul (KR)

(72) Inventors: Boyeon Kim, Seoul (KR); Bina Kim, Seoul (KR); Jinsu Kim, Seoul (KR); Mina Suh, Seoul (KR); Jungkyu Son, Seoul (KR); Hyesun Lee, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 16/805,228

(22) Filed: Feb. 28, 2020

(65) Prior Publication Data

US 2021/0046831 A1 Feb. 18, 2021

(30) Foreign Application Priority Data

Aug. 14, 2019 (KR) .................. 10-2019-0099438

(51) Int. Cl.
| | |
|---|---|
| *B60L 53/12* | (2019.01) |
| *H02J 50/10* | (2016.01) |
| *H02J 50/80* | (2016.01) |
| *H02J 7/00* | (2006.01) |
| *G06N 20/00* | (2019.01) |
| *H02J 7/02* | (2016.01) |
| *B60L 53/66* | (2019.01) |
| *B60L 53/35* | (2019.01) |
| *B25J 9/16* | (2006.01) |

(52) U.S. Cl.
CPC .............. *B60L 53/12* (2019.02); *B25J 9/163* (2013.01); *B60L 53/35* (2019.02); *B60L 53/66* (2019.02); *G06N 20/00* (2019.01); *H02J 7/0013* (2013.01); *H02J 7/0047* (2013.01); *H02J 7/02* (2013.01); *H02J 50/10* (2016.02); *H02J 50/80* (2016.02)

(58) Field of Classification Search
CPC ........................................................ B60L 53/12
USPC ........................................................ 320/108
See application file for complete search history.

(56) References Cited

U.S. PATENT DOCUMENTS

| | | | | |
|---|---|---|---|---|
| 2006/0011220 A1* | 1/2006 | Mueller | .................... | B08B 3/00 |
| | | | | 134/45 |
| 2008/0174268 A1 | 7/2008 | Koo et al. | | |
| 2018/0237086 A1* | 8/2018 | Evans | ........................ | B60F 5/02 |

(Continued)

FOREIGN PATENT DOCUMENTS

KR 10-2008-0060535 A 7/2008

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

A robot charging system and a control method thereof are provided to determine a charged state and charge a robot through self-driving. The robot charging system includes: a server configured to store boarding information of a user; a robot configured to receive the boarding information from the server, move the user to a destination included in the boarding information by self-driving using charged power, determine a discharge of the power, and move to a charging station for charging; and the charging station provided with a power supply coil to wirelessly supply the power source to the robot, and provided with a moving rail on a top of the power supply coil to sequentially charge a plurality of robots.

22 Claims, 9 Drawing Sheets

(56) References Cited

U.S. PATENT DOCUMENTS

2019/0108757 A1\* 4/2019 Watanabe .............. G08G 1/005
2019/0270198 A1\* 9/2019 Ferguson ................ B25J 9/162

\* cited by examiner

CHARGING SYSTEM FOR ROBOT AND CONTROL METHOD THEREOF

CROSS-REFERENCE TO RELATED APPLICATIONS

The present application claims priority under 35 U.S.C. 119 to Korean Patent Application No. 10-2019-0099438, filed on Aug. 14, 2019, in the Republic of Korea, which is hereby incorporated by reference in its entirety.

BACKGROUND

The present disclosure relates to a charging system for a robot and a control method thereof, and more particularly, to a charging system for a robot and a control method thereof to determine a charged state and charge a robot through self-driving.

Recently, functions of a robot are expanding due to development of deep learning technology, self-driving technology, automatic control technology, the Internet of Things, and the like.

In regard to each technology in detail, the deep learning is one of fields of machine learning. The deep learning a technology of allowing a program to execute similar determinations in various situations, not checking conditions and setting the program with commands in advance. Accordingly, according to the deep learning, a computer can think similarly to a human brain and analyze massive amounts of data.

Self-driving is a technology that allows machine to determine on its own to move and avoid an obstacle. According to the self-driving technology, a robot autonomously recognizes a location through a sensor to move and avoid an obstacle.

An automatic control technology refers to a technology for automatically controlling an operation of machine by feeding back a measured value obtained by inspecting a state of the machine in the machine to a control device. Accordingly, the machine can be controlled without a human operation, and a target to be controlled can be automatically adjusted to fall within a targeted range, that is, to a target value.

The Internet of Things refers to an intelligent technology and service that connects all things based on the Internet and communicates information between a person and a thing, and between things. Devices connected to the Internet by the Internet of Things transmit and receive the information by their own determinations and communicate with each other autonomously without any assist of a human.

Applications of the robot are generally classified into industrial, medical, astronautic, and submarine field. For example, the robot may perform repetitive tasks in the machining industry such as automobile manufacturing. In other words, a lot of industrial robots have been already in operation in which the robots can repeat the same motion for hours once a human teaches a task performed by an arm to the robots.

Particularly, since most autonomous robots are driven by batteries, discharging occurs inevitably while driving, and thus charging is required.

In this regard, Korean Patent Publication No. 10-2008-0060535 (APPARATUS FOR AUTOMATIC CHARGING OF THE AUTONOMOUS MOBILE ROBOT AND METHOD FOR AUTOMATIC CHARGING USED THE SAME) discloses a technology for automatically guiding a robot to a charging station to charge a battery by detecting infrared signal emitted from the charging station.

However, the related art uses the infrared signal so it is inconvenient to detect the infrared signal constantly. In addition, since a docking is required, a plurality of robots cannot be charged simultaneously, and the robots cannot be controlled before and after the charging.

SUMMARY

The embodiments provide a charging system of a robot controlled by a server so as to be driven autonomously and charged simultaneously.

In addition, the embodiments also provide a method of controlling a robot charging system for allowing a robot to determine a charged amount and charge the robot after a user completes the move to a destination, and move to a designated location after charging is complete.

To this end, the embodiments provide a robot charging system including: a server configured to store boarding information of a user; a robot configured to receive the boarding information from the server, move the user to a destination included in the boarding information by self-driving using charged power, determine a discharge of the power, and move to a charging station for charging; and the charging station provided with a power supply coil to wirelessly supply the power source to the robot, and provided with a moving rail on a top of the power supply coil to sequentially charge a plurality of robots.

According to the embodiments, the robot may further include: a communication unit configured to communicate with the server to transmit and receive the boarding information of the user or location information of the robot; a sensing unit configured to recognize whether the user arrives at the destination by using the boarding information or location information received from the communication unit; and a processor configured to determine a charging amount of the power source when the sensing unit determines an arrival completion, and control a movement with respect to the charging station.

According to the embodiments, the processor, after the user arrives at the destination, may control a movement of the robot to the charging station by determining whether a reserved user move to a destination, and may control a movement to the charging station closest to the robot.

According to the embodiments, after the charging of the robot is completed, the processor may control a movement of the robot to a repository to wait for a reserved user.

According to the embodiments, the processor may control the robot to move to a mounting station by determining whether an auxiliary device is necessary for a movement of the reserved user.

According to the embodiments, the charging station further includes a power supply coil configured to wirelessly supply power to charge the robots simultaneously; and the moving rail installed on the top of the power supply coil to enable the robots to be charged while sequentially moving, wherein the robots may be sequentially charged after waiting according to a movement of the moving rail. According to the embodiments, the charging station may further include a sterilization module installed on upper both sides of the moving rail to irradiate ultraviolet rays to sterilize the robot according to the movement of the moving rail.

According to the embodiments, the robot may receive location information of a repository from the server after the charging is completed and move to the repository out of the charging station.

In addition, the embodiments provide a method of controlling a robot charging system, which includes: a first step of receiving boarding information from a server by a communication unit of the robot, and determining whether the robot arrives at a destination of a user included in the boarding information by a sensing unit of the robot; a second step of controlling a movement to a charging station and a charging of the robot by determining a charging amount of power of the robot according to determination of the sensing unit on an arrival completion, by a processor of the robot; and a third step of moving the robot to a repository for a reserved user or moving the robot to a mounting station to mount an auxiliary device when the auxiliary device for a movement of the reserved user is necessary, after the charging of the robot is completed.

According to the embodiments, the first step may further include: determining whether the robot is located at a destination of the user included in the boarding information, by the sensing unit.

According to the embodiments, the first step may further include: determining whether the user leave a boarding place on the robot, by the sensing unit.

According to the embodiments, the first step may further include: receiving an acceptance from the user when the robot arrives at the destination, by the sensing unit.

According to the embodiments, the second step may include: moving a plurality of robots to an upper portion of a power supply coil by moving a moving rail provided in the charging station; and wirelessly supplying power from a power supply coil to simultaneously charge the robots.

According to the embodiments, the second step may include: sterilizing the robots, which move according to a movement of the moving rail, in a sterilization module installed on upper both sides of the charging station.

According to the embodiments, the second step may include: receiving boarding information of a reserved user from the server after the charging of the robot is completed; and determining a next destination of the robot according to the boarding information, by the processor of the robot.

According to the embodiments, the third step may include: considering a reserved place and a reserved time according to the boarding information of the reserved user, and moving the robot by selecting one of a plurality of repositories.

According to the embodiments, the third step may include: receiving, from the server, the quantity of the auxiliary device stored in the mounting station to which the reserved user intends to move; and moving to a next mounting station when the quantity is insufficient.

DETAILED DESCRIPTION OF THE EMBODIMENTS

Figure 1:
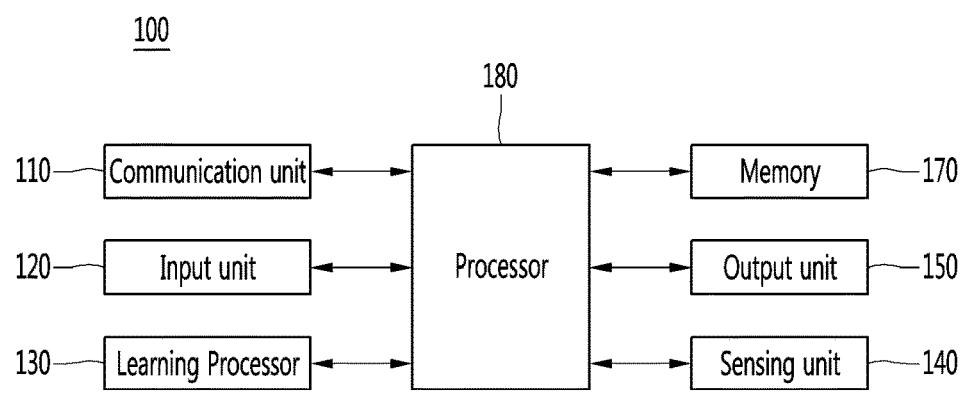
FIG. 1 illustrates an AI device including a robot according to one embodiment.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device including a robot according to one embodiment.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
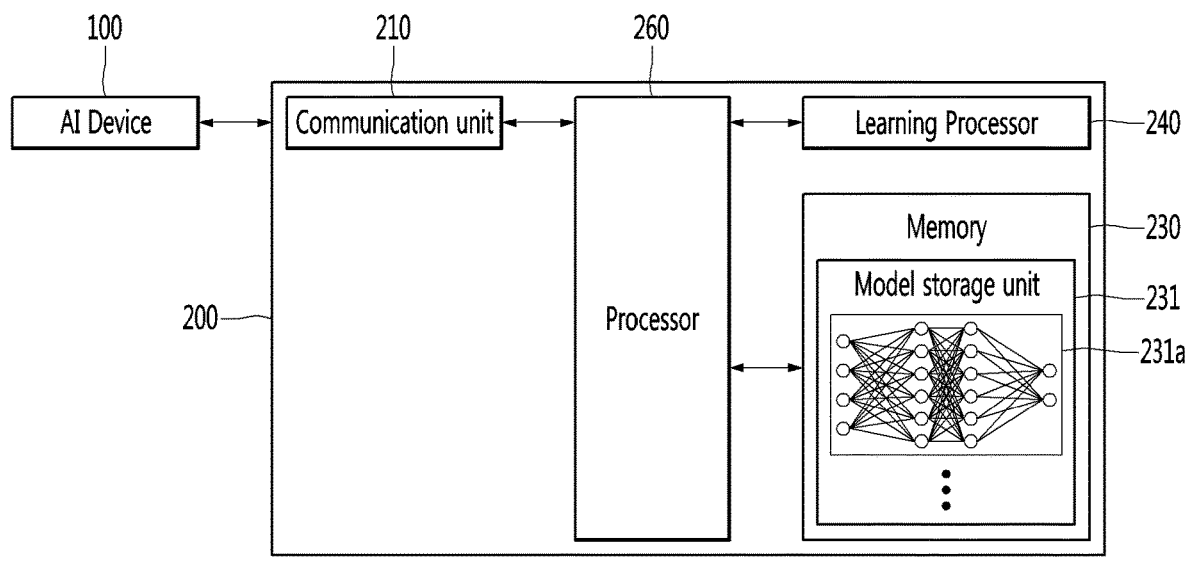
FIG. 2 illustrates an AI server connected to a robot according to one embodiment.

FIG. 2 illustrates an AI server connected to a robot according to one embodiment.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
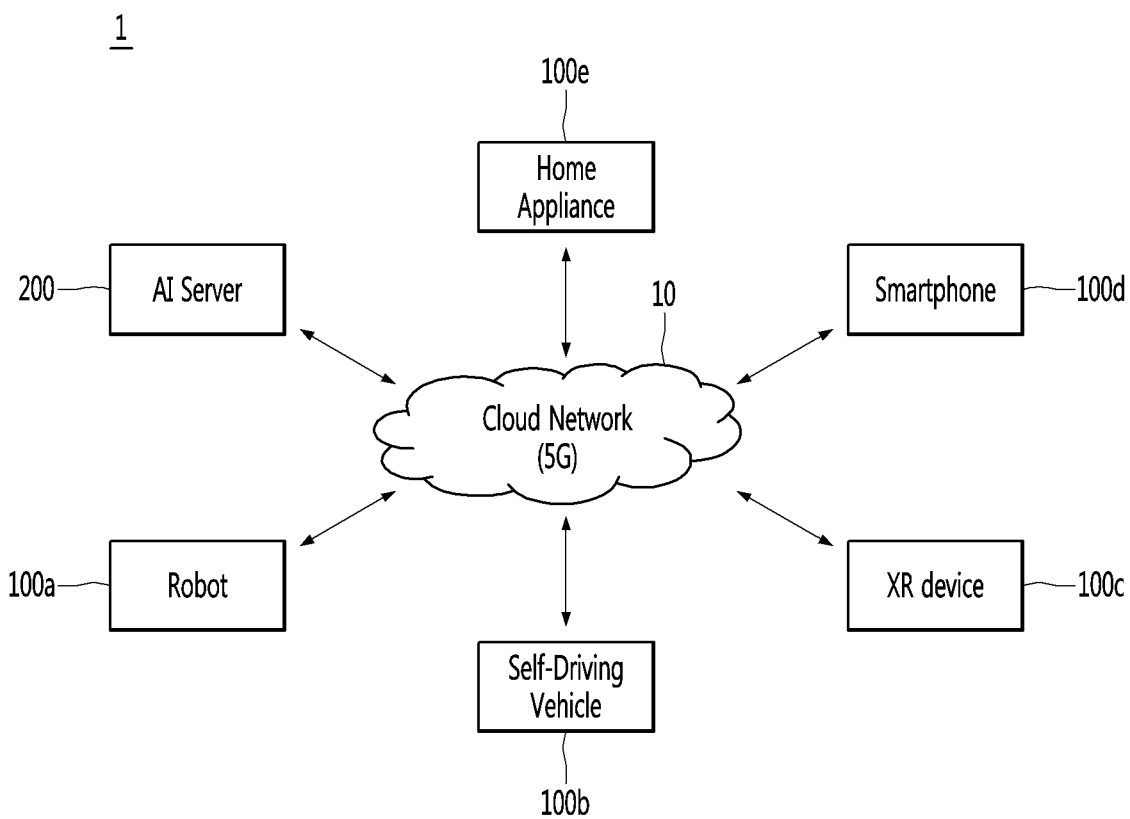
FIG. 3 illustrates an AI system including a robot according to one embodiment.

FIG. 3 illustrates an AI system including a robot according to one embodiment.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as plants and desks. The object identification information may include a name, a type, a distance, and a position.

In addition, the robot 100a may perform the operation or travel by controlling the driving unit based on the control/ interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<Robot System>

Figure 4:
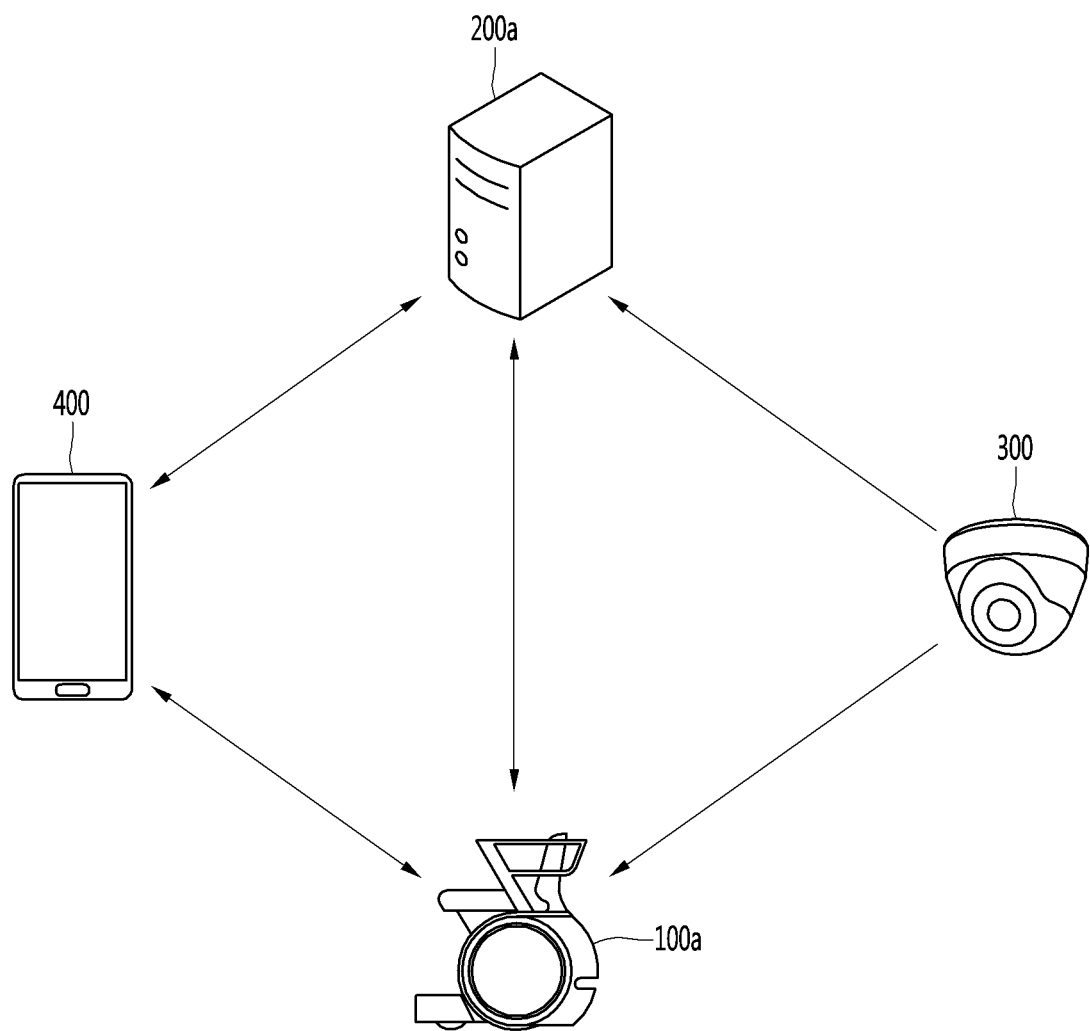
FIG. 4 is a system diagram showing a structure of a robot system according to the embodiments.

FIG. 4 is a diagram illustrating the structure of a robot system according to one embodiment.

Referring to FIG. 4, the robot system may include a robot 100a, a server 200a, a camera 300, and a mobile terminal 400.

The robot 100a may perform patrol, guidance, cleaning, disinfection and transportation.

The robot 100a may transmit and receive signals to and from the server 200a or the mobile terminal 400. For example, the robot 100a may transmit and receive signals including information on the situation to and from the server 200a. In addition, the robot 100a may receive image information of the areas from the camera 300.

Accordingly, the robot 100a may monitor the situation through the image information captured by the robot 100a and the image information received from the camera 300.

The robot 100a may directly receive a command from the user. For example, a command may be directly received from the user through input of touching the display unit provided in the robot 100a or voice input.

The robot 100a may perform patrol, guidance, cleaning, etc. according to the command received from the user, the server 200a, or the mobile terminal 400.

Next, the server 200a may receive information from the robot 100a, the camera 300, and/or the mobile terminal 400. The server 200a may collect, store and manage the information received from the devices. The server 200a may transmit the stored information to the robot 100a or the mobile terminal 400. In addition, the server 200a may transmit command signals to a plurality of the disposed robots 100.

The camera 300 may include all cameras which are installed, such as a plurality of closed circuit television (CCTV) cameras, an infrared thermal-sensing camera, etc. The camera 300 may transmit the captured image to the server 200a or the robot 100a.

The mobile terminal 400 may transmit and receive data to and from the server 200a. For example, the mobile terminal 400 may receive data such as a flight time schedule, a map, etc. from the server 200a.

A user may receive necessary information from the server 200a through the mobile terminal 400. In addition, the mobile terminal 400 may transmit data such as a photo, a moving image, a message, etc. to the server 200a. For example, the user may transmit the photograph of a missing child to the server 200a to report the missing child or photograph an area where cleaning is required through the camera to request cleaning of the area.

In addition, the mobile terminal 400 may transmit and receive data to and from the robot 100a.

For example, the mobile terminal 400 may transmit, to the robot 100a, a signal for calling the robot 100a, a signal for instructing that specific operation is performed, or an information request signal. The robot 100a may move to the position of the mobile terminal 400 or perform operation corresponding to the instruction signal in response to the call signal received from the mobile terminal 400. Alternatively, the robot 100a may transmit data corresponding to the information request signal to the mobile terminal 400 of the user.

Figure 5:
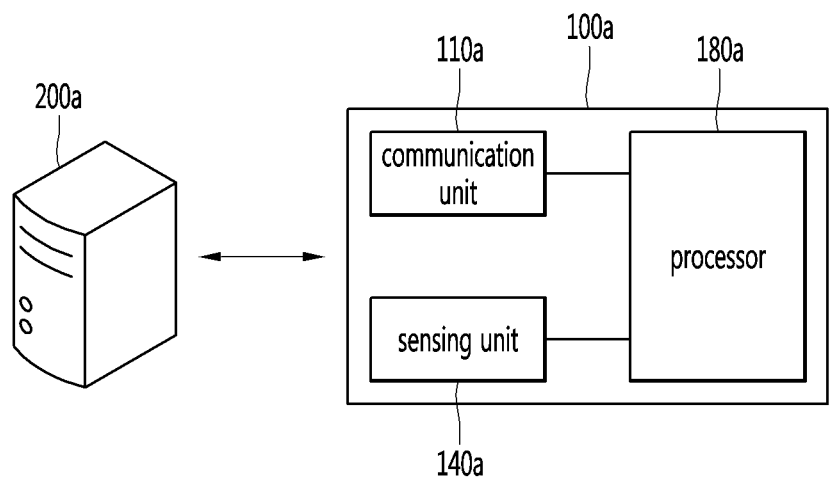
FIG. 5 illustrates a configuration of the robot according to one embodiment.

FIG. 5 illustrates a configuration of the robot 100a according to one embodiment.

Referring to FIG. 5, a charging system of the robot 100a may include a server 200a, a robot 100a, and a charging station 500.

The server 200a may store boarding information of a user. The server 200a manages all boarding information of the robot 100a used by a plurality of users. The boarding information may be managed after storing a location where the user boards, a location of the charging station 500 that performs charging, and each location of the robot 100a and the charging station 500.

The server 200a may communicate with the robot 100a, and provide boarding information about a location of a near user or the location of the charging station 500, and the robot 100a may be provided with a communication unit 110a to communicate with the server 200a.

The robot 100a may receive the boarding information from the server 200a, move the user to a destination included in the boarding information by self-driving using charged power, determine a discharge of the power, and move to the charging station for charging.

The robot 100a may include the communication unit 110a, a sensing unit 140a, and a processor 180a.

The communication unit 110a may transmit and receive, with the server 200a, boarding information of the user or location information of the robot 100a. The boarding information is provided from the server 200a, in which the boarding information may be previously provided to the server 200a through a reservation by the user, or may be provided to the server 200a in real time by using a mobile 400 or the like.

The communication unit 110a may transmit and receive data to and from external devices such as other AI devices 100a to 100e or AI servers 200a and 200 using wired or wireless communication technology. For example, the communication unit 110a may transmit and receive sensor information, a user input, a learning model, a control signal, and the like, with the external devices.

At this time, a communication technology used by the communication unit 110a may include global system for mobile communication (GSM), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), and the like. That is, the communication unit 110a may include at least one communication interface (or communication transceiver) each supports the communication technology.

The sensing unit 140a may recognize whether the user has arrived at the destination by using the boarding information or location information received from the communication unit 110a. The sensing unit 140a may include a lidar, GPS, or the like, and recognize a current location through a traveling map provided from the server 200a.

The sensing unit 140a may be installed at a rear surface, a side surface, a lower portion of the robot 100a, and may include any device to recognize a current place of the robot 100a. In addition, the robot may include a sensor for sensing a movement, such as a pressure sensor or vibration sensor, to recognize the movement of the user, based on assumption that the user moves upon arrival at the destination.

The processor 180a, may determine a charging amount of the power when the sensing unit determines an arrival completion, and control a movement with respect to the charging station 500.

According to the embodiments, when determining the charging amount, the processor 180a may decide whether to charge by determining the capability of traveling after the arrival to the destination.

For example, assumed that an average moving distance of the robot 100a is X meters for one time, a maximum moving distance is Y meters, and a distance to the charging station is Z meters, the robot may be instructed to be charged when a remaining charging amount does not exceed X+Y+Z. However, the configuration is not limited thereto and may be changed.

The processor 180a, after the user arrives at the destination, may control a movement of the robot to the charging station 500 by determining whether a reserved user move to a destination, and may control a movement to the charging station 500 closest to the robot 100a.

The communication unit 110a may receive information on surrounding environments from the server 200a, and may control the movement to the closest charging station 500 by taking a location of the current robot 100a into consideration.

The processor 180a, may control a movement of the robot to a repository to wait for a reserved user, after the charging of the robot 100a is completed. According to the embodiments, after the arrival of the destination, the processor 180a may confirm whether a next user is reserved in the server 200a, determine the charging amount, and allow the robot to move to the repository when the charging amount is sufficient. In this case, the robot may move to a repository closer to a boarding location of the next user.

The processor 180a, may control the robot 100a to move to a mounting station by determining whether an auxiliary device is necessary for a movement of the reserved user. Although the robot may be controlled to move to the repository, when the next user is an infant, a handicapped or the like, an additional accessory may be necessary.

The processor 180a may allow the robot to move to the mounting station to mount the accessory when the accessory is necessary for the next user and may determine the number of the accessory to be provided. After the arrival at the destination, the processor may designate a mounting station to which the robot moves, by determining an inventory amount from the mounting station closest to the destination.

When moving to the mounting station for the accessory, the robot may move to a suitable place by taking into consideration of both the distance based on a current location and the inventory status of the accessory, thereby reducing an unnecessary movement, so that a distance, time, and battery consumption required for the movement can be minimized.

The charging station 500 may be provided with a power supply coil 502 to wirelessly supply power to the robot 110a, and may be provided with a moving rail 501 on a top of the power supply coil 502 to sequentially charge a plurality of robots 100a. Hereinafter, the embodiments will be described with reference to FIG. 6.

Figure 6:
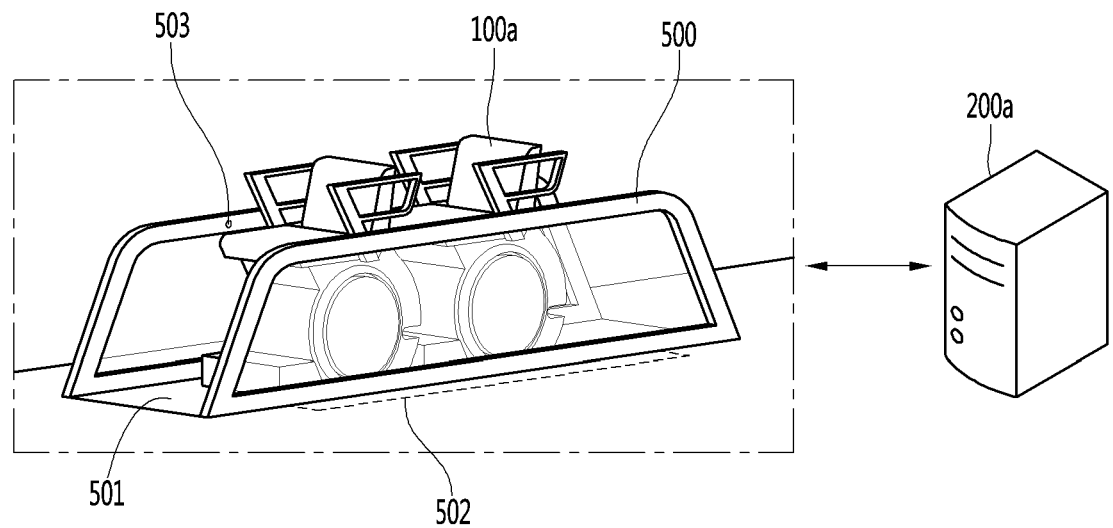
FIG. 6 illustrates a charging station according to one embodiment.

FIG. 6 illustrates a charging station 500 according to one embodiment.

Referring to FIG. 6, the charging station 500 according to one embodiment, may include a power supply coil 502 for supplying power, a moving rail 501, and a sterilization module 503.

The power supply coil 502 may wirelessly supply power to simultaneously charge a plurality of robots 100a. The power supply coil 502 is generally applied to large equipment such as a railway or a magnetic levitated train, and may be buried and generate a magnetic field to induce power.

In the embodiments, the magnetic field may be converted into electrical energy through a current collector mounted at a lower portion by using the power supply coil 502. The power supply coil 502 is used for inductive power of the coil, so that the robot 100a may be charged by generating an induced electromotive force with respect to the coil installed in the robot 100a while a plurality of robots 100a move.

The moving rail 501 serves to move the robot 100a in the charging station 500, and the robots 100a may be sequentially charged to overcome narrowness of a charging space.

According to one embodiment, the sterilization module 503 may be installed on upper portions of both sides of the moving rail 501, and irradiate ultraviolet rays to sterilize the robot 100a according to the movement of the moving rail 501.

The sterilization module 503 may be designed to adjust an irradiation amount by taking an average moving time of the robot 100a into consideration so that sterilization may be completed during the above time.

The charging station 500 may transmit a state, such as a standby, currently charging, and charging completed, of each robot 100a among the robots 100a to the server 200a through an RFID or the like attached to each robot 100a. A place where each robot 100a among the robots 100a is located at a specific charging station 500 may be checked by communicating with the server 200a, so that the charging availability of a next robot 100a may be determined for each charging station 500.

The robot 100a may receive location information of the repository from the server 200a after the charging is completed and move to the repository from the charging station 500. At this time, the number of stored robots 100a, for each repository, stored in the server 200a may be checked, so that the robot may move after considering the location for first priority and the storage availability for second priority.

Figure 7:
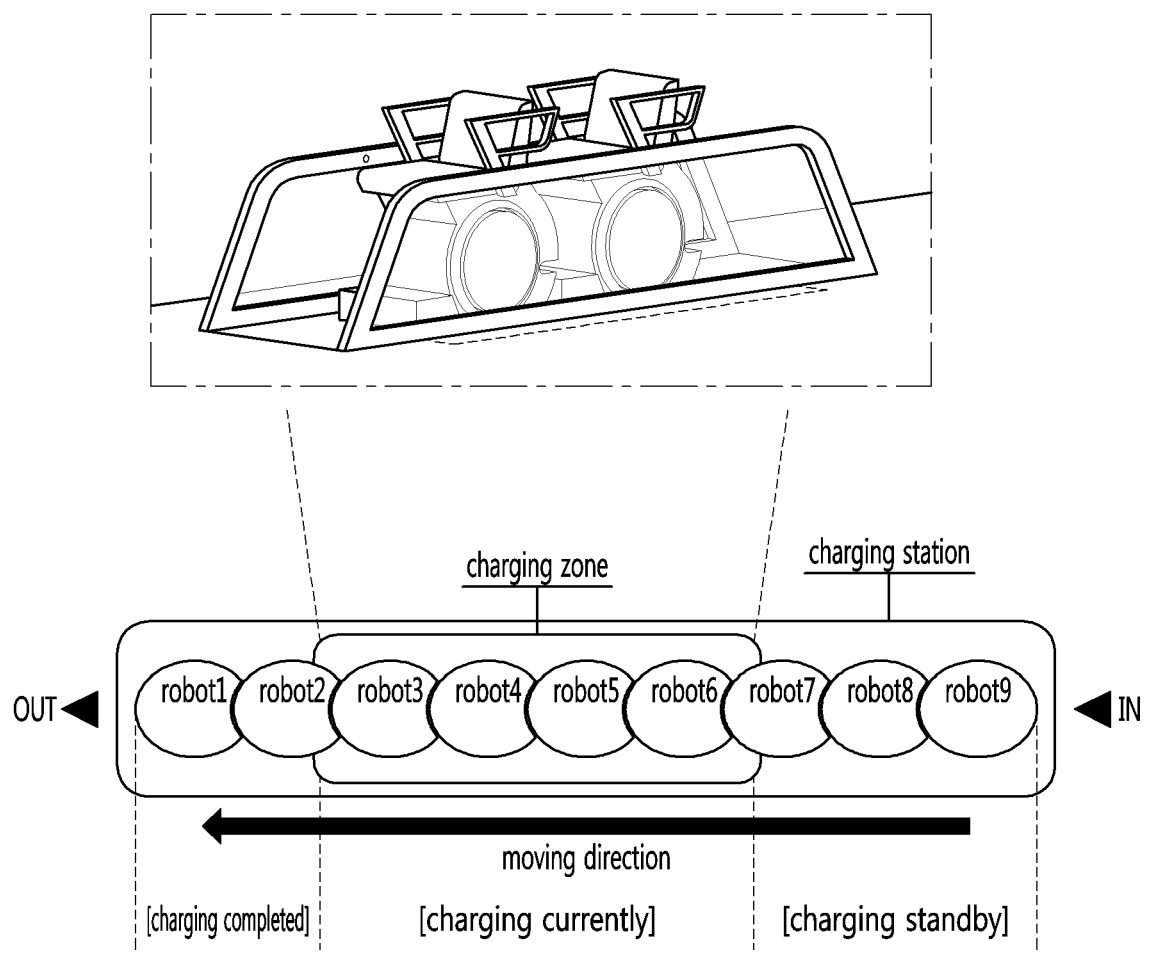
FIG. 7 illustrates a state in which a plurality of robots are wirelessly charged sequentially in the charging station according to one embodiment.

FIG. 7 illustrates a state in which a plurality of robots 100a are wirelessly charged sequentially in the charging station 500 according to one embodiment Referring to FIG. 7, the robots 100a may sequentially move along the moving rails 501, and may be wirelessly charged by the power supply coil 502 at a lower portion of the robot while moving. A length of a charging zone of the charging station 500 may be adjusted after taking into consideration of the time required for charging and the speed of the moving rail 501.

The robot 100a may communicate the progress to the server 200a, and the server 200a may inform the other robots 100a of a current status of each charging station 500 through communication with the other robots 100a.

Figure 8:
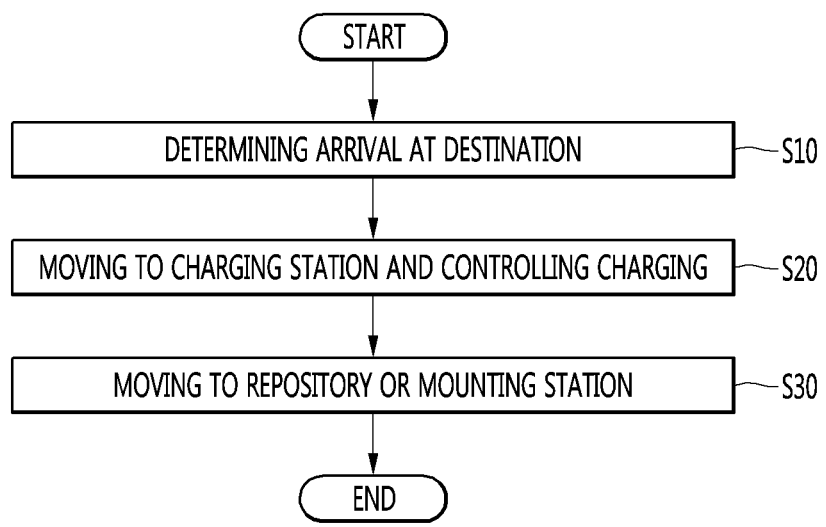
FIG. 8 illustrates a flowchart of a control method of a charging system for a robot according to one embodiment.

FIG. 8 illustrates a flowchart of a control method of the charging system for the robot 100 according to one embodiment.

Referring to FIG. 8, the method according to the embodiments may include: determining whether the robot has arrived at the destination (S10), controlling the movement to the charging station 500 and the charging (S20), and moving to the repository or mounting station (S30). In the step S10 of determining whether the robot has arrived at the destination, the communication unit 110a of the robot 100a may receive the boarding information from the server 200a, and the sensing unit 140a of the robot 100a may determine a location of the user included in the boarding information.

The sensing unit 140a may be installed at a rear surface, a side surface, a lower portion of the robot 100a, and may include any device to recognize a current place of the robot 100a. In addition, the robot may include a sensor for sensing a movement, such as a pressure sensor or vibration sensor, to recognize the movement of the user, based on assumption that the user moves upon arrival at the destination.

In the step S20 of controlling the movement and charging to the charging station 500, the processor 180a of the robot 110a may determine a charging amount of power of the robot 100a according to determination of the sensing unit 140a on an arrival completion.

According to the embodiments, when determining the charging amount, the processor 180a may decide whether to charge by determining the capability of traveling after the arrival to the destination.

In the step S30 of moving to the repository or mounting station, the robot 100a may move to the repository for a reserved user or move to the mounting station to mount an auxiliary device when the auxiliary device for a movement of the reserved user is necessary, after the charging of the robot 100a is completed.

The repository refers to a place to wait for the next user. The mounting station refers to a place to mount the auxiliary device before moving to the repository when the auxiliary device is necessary for the next user. After the arrival at the destination, the robot 100a may receive and determine usage information of the next user through communication with the server 200a.

Figure 9:
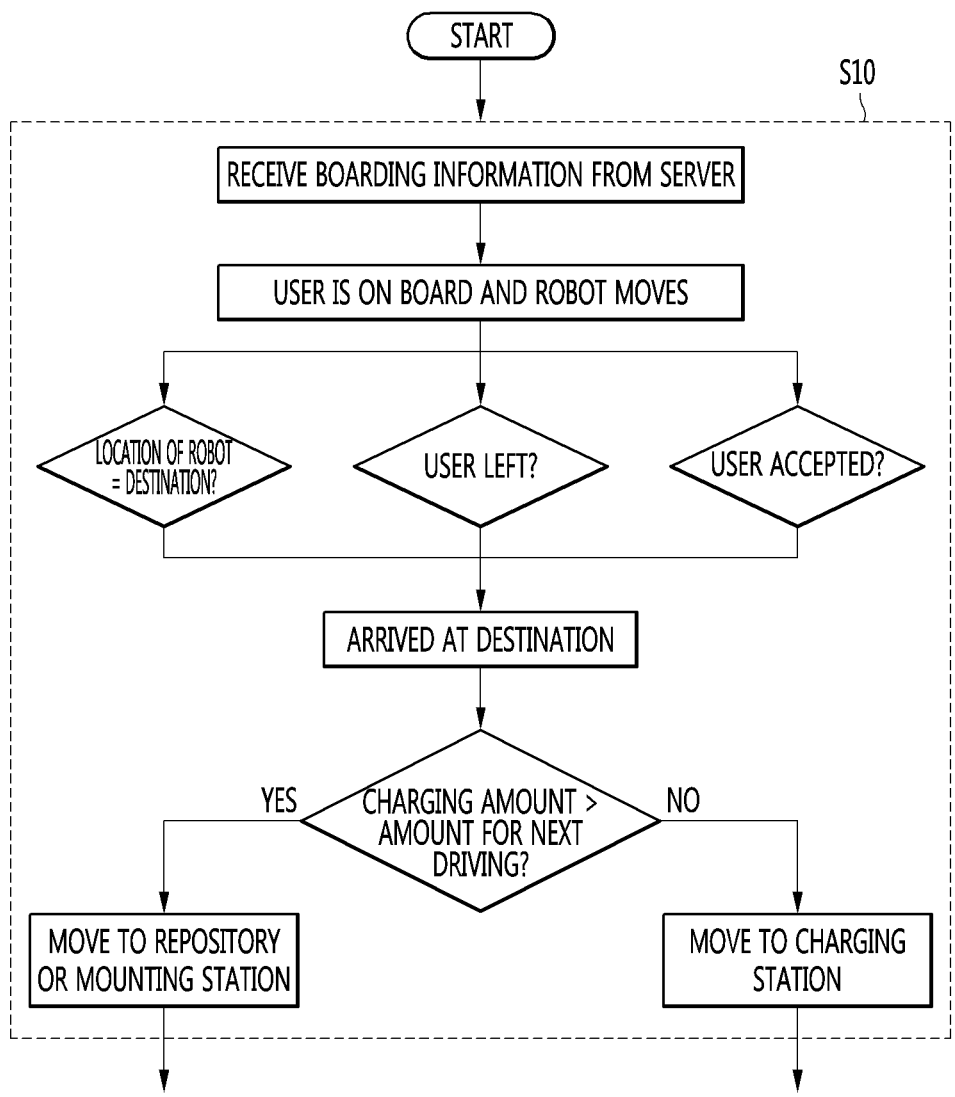
FIG. 9 illustrates a detailed flowchart of a first step according to one embodiment.

FIG. 9 illustrates a detailed flowchart of the first step S10 according to one embodiment.

Referring to FIG. 9, the robot 100a may receive the boarding information from the server 200a, move after boarding of the user, determine the destination, and move to the next place.

According to various embodiments, a process of determining whether the robot 100a has arrived at the destination may include three types.

The sensing unit 140a may determine whether the robot 100a is located at the destination of the user included in the boarding information, in which the sensing unit 140a may determine the arrival at the destination based on physical coordinates where the robot 100a is actually located by using a GPS, a lidar, or the like.

However, even before the arrival at the destination, a place required by the user may become a destination. Accordingly, when the user leaves the robot 100a or the user accepts the place as the destination, the place may be included as a destination.

Accordingly, the sensing unit 140a may include a device configured to sense a leaving of the user, may further include determining whether the user has left the boarding position on the robot 100a, and may further include a step in which the sensing unit 140a receives an acceptance, from the user, about the arrival of the robot 100a at the destination.

After the arrival at the destination is completed, a step of searching for the next place proceeds. Although not shown in the drawings, when not placed on the destination, the robot 100a may attempt to automatically move to a preset destination. When the user arrives at a set destination due to a GPS error or the like and does not want the incorrect destination, the user may move the robot 100a to the destination by manual operation, in which the destination may be recognized by the robot 100a through a user acceptance.

Figure 10:
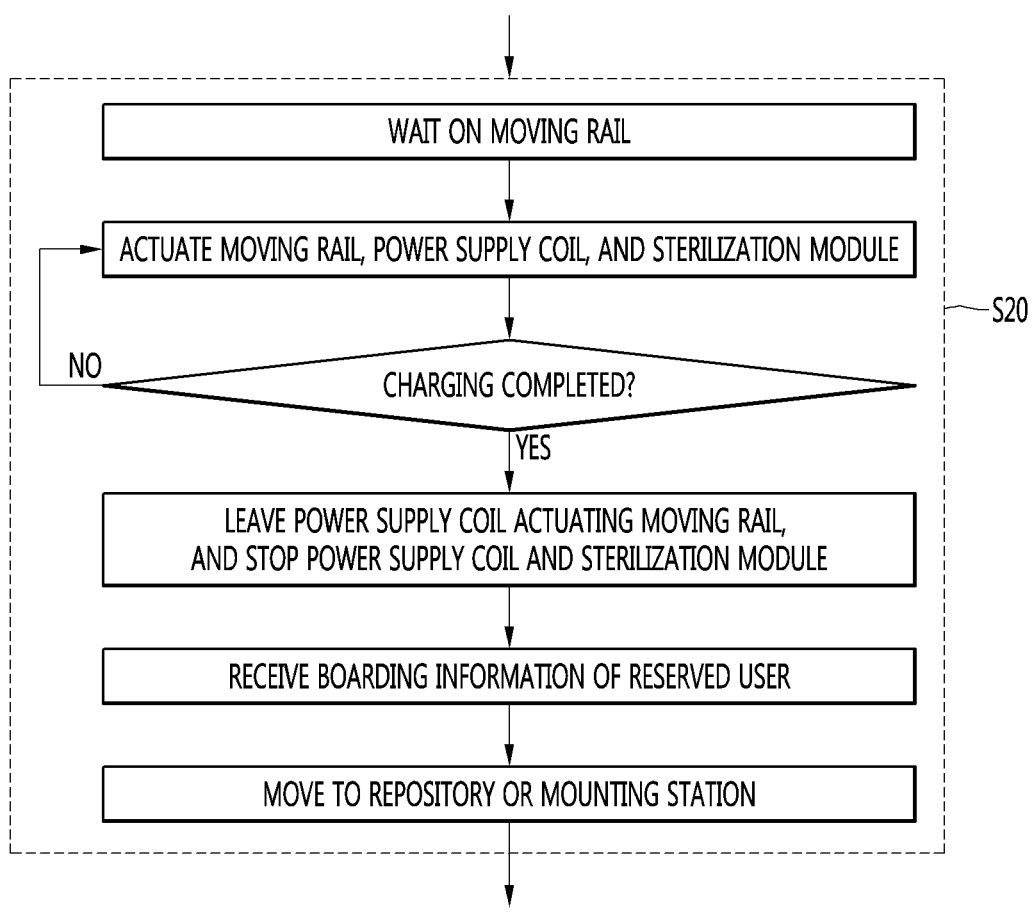
FIG. 10 illustrates a detailed flowchart of a second step according to one embodiment.

FIG. 10 illustrates a detailed flowchart of the second step S20 according to one embodiment.

Referring to FIG. 10, the robot 100a may await at an entrance of the charging station 500, and the wireless charging and sterilization may be performed according to the movement of the moving rail 501. When the charging is completed and there is no robot 100a to charge, the moving rail 501 may move the last charged robot 100a to a completion place, and stop the power supply coil 502 and the sterilization module 503.

In the second step S20, a plurality of robots 100a may be moved to an upper portion of the power supply coil 502 by moving the moving rail 501 provided in the charging station 500, and the power may be wirelessly supplied from the power supply coil 502 to simultaneously charge the robots 100a.

In the second step S20, the robots that move according to the movement of the moving rail may be sterilized by the sterilization module 503 installed on upper portions of both sides of the charging station. The sterilization module 503 may be installed on upper portions of both sides of the moving rail 501, and may irradiate ultraviolet rays to sterilize the robot 100a according to the movement of the moving rail 501.

The sterilization module 503 may be designed to adjust an irradiation amount by taking an average moving time of the robot 100a into consideration so that sterilization may be completed during the above time.

After the charging is completed, it may be unnecessary to review a movement to the charging station 500 unlike the first step, and boarding information of a reserved user may be received from the server 200a after the charging of the robot 100a is completed so that a next destination of the robot 100a may be determined. The next destination may be the repository or the mounting station, and will be described again with reference to FIG. 11 below.

Figure 11:
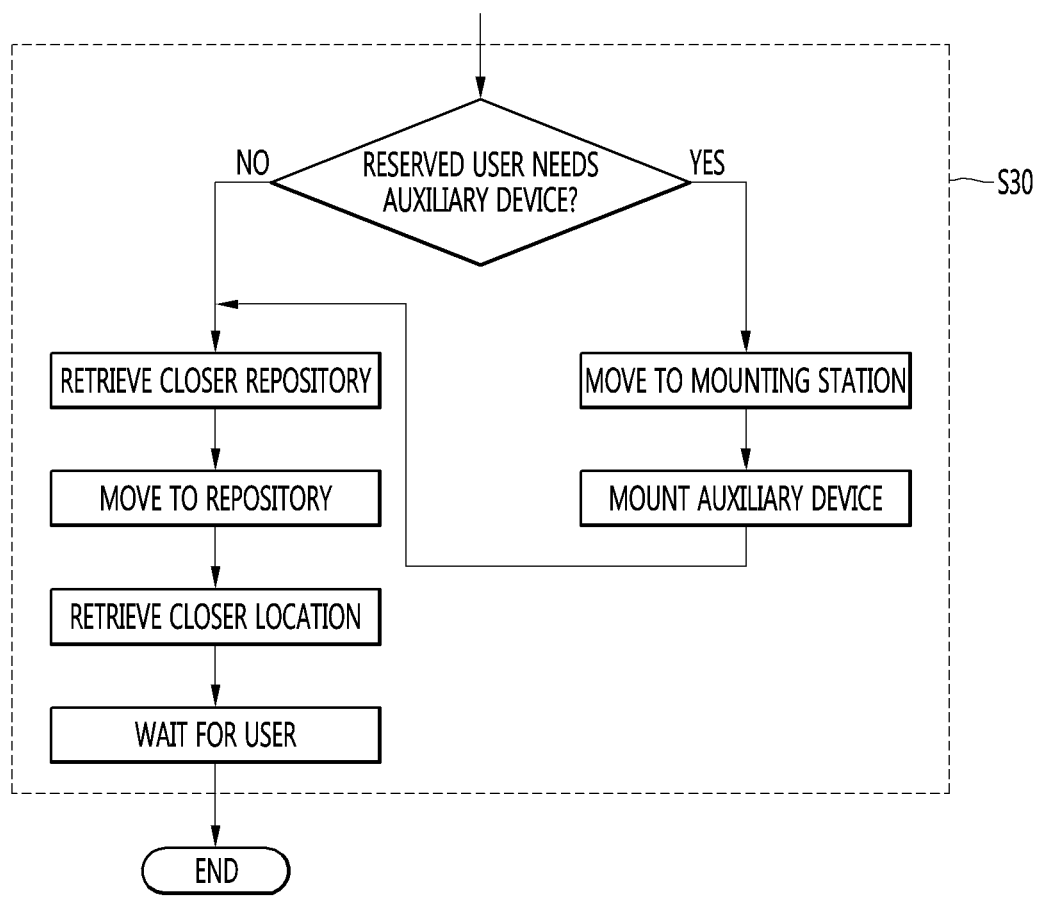
FIG. 11 illustrates a detailed flowchart of a third step according to one embodiment.

FIG. 11 illustrates a detailed flowchart of the third step S30 according to one embodiment.

Referring to FIG. 11, in the third step S30, the robot 100a may move after selecting one of a plurality of repositories by considering a reserved place and a reserved time according to the boarding information of the reserved user.

The boarding information of the reserved user may be various, such as boarding location and destination, but is not a factor to consider whether to stop by while going to the repository. Accordingly, only the use of the auxiliary device may be considered.

In the case that the necessity of the reserved user for the auxiliary device is determined, when the auxiliary device is unnecessary, the robot may move to a closer repository and wait for the user, or when the auxiliary device is required, the robot may move to the repository after mounted thereon with the auxiliary device in the mounting station.

In this case, the robot 100a may receive, from the server 200a, the number of the auxiliary devices stored in the mounting station to which the robot may move. When the number is insufficient, the robot may move to a next mounting station. At this time, according to the embodiments, the closest place may be set by first priority, and then a place to which the robot moves may be determined based on the quantity.

According to the embodiments, the robot 100a can autonomously determine the charging amount, move to the charging station 500 through self-driving, wirelessly charge a plurality of robots 100a. In addition, after the charging, the robot 100a can move to the repository for the next user or move to the mounting station when the auxiliary device is required.

According to the aforementioned embodiments, the robot can determine a charged amount and move to the charging station by self-driving.

In addition, according to the embodiments, a plurality of robots can be wirelessly charged, and the robots can move autonomously after charged, for a next user.

Although the present disclosure has been described in detail with reference to the representative embodiments, it will be apparent that a person having ordinary skill in the art may carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A robot charging system, comprising:
    a server configured to store boarding information of a user;
    at least one robot, the robot being configured to:
        receive the boarding information from the server,
        move the user to a destination included in the boarding information using charged power,
        determine a discharge amount of the charged power, and
        move to a charging station for charging based on charging availability information received from the server; and
    at least one charging station configured to transmit the charging availability information including a charging state of each robot to the server, the charging station including:
        a charging zone including a power supply coil to wirelessly supply the charged power to the robot; and
        a moving rail configured to move the robot past the power supply coil to charge the robot.

2. The robot charging system according to claim 1, wherein the robot includes:
    a communication interface configured to communicate with the server to transmit and receive the boarding information of the user or location information of the robot;
    at least one sensor configured to recognize whether the user has arrived at the destination by using the boarding information or the location information received from the communication interface; and
    a processor configured to:
        determine a charging amount of the charged power when the at least one sensor determines that the user has arrived at the destination, and
        control a movement of the robot with respect to the charging station.

3. The robot charging system according to claim 2, wherein the at least one charging station includes a plurality of charging stations, and
    wherein the processor is further configured to control the movement of the robot to a closest charging station among the plurality of charging stations when the controller determines that the charged power is not sufficient for the robot to move a reserved user to a reserved user destination.

4. The robot charging system according to claim 2, wherein the processor is further configured to control the movement of the robot to a repository to wait for a reserved user after the charging of the robot is completed.

5. The robot charging system according to claim 4, wherein the processor is further configured to control the robot to move to a mounting station when an auxiliary device is required for a movement of the reserved user.

6. The robot charging system according to claim 1, wherein the moving rail is disposed above the power supply coil.

7. The robot charging system according to claim 1, wherein the at least one robot includes a plurality of robots.

8. The robot charging system according to claim 7, wherein the power supply coil is configured to wirelessly supply power to two or more robots of the plurality of robots simultaneously, and
wherein the moving rail is disposed above the power supply coil to enable the robots to be charged while sequentially moving the two or more robots past the power supply coil according to a movement of the moving rail.

9. The robot charging system according to claim 8, wherein the charging station further includes a sterilizer installed on upper, opposite sides of the moving rail to irradiate ultraviolet rays towards the two or more robots to sterilize the two or more robots according to the movement of the moving rail.

10. The robot charging system according to claim 8, wherein each robot of the two or more robots is configured to receive location information of a repository from the server after the charging is completed and to move to the repository from the charging station.

11. A method of controlling a charging system for a robot, the method comprising:
receiving, by a communication interface of the robot, boarding information from a server;
determining, by at least one sensor of the robot, whether the robot arrives at a destination of a user included in the boarding information;
determining, by a processor of the robot, a charging amount of a charged power when the at least one sensor determines that the robot has arrived at the destination of the user;
receiving, by a processor of the robot, charging availability information of charging stations from the server;
determining, by a processor of the robot, a charging station based on the charging availability information by taking a location of the robot;
controlling, by the processor of the robot, the robot to move to the charging station;
charging the robot at the charging station;
transmitting, by the charging station, the charging availability information including a charging state of each robot to the server; and
moving the robot to a repository for a reserved user or moving the robot to a mounting station to mount an auxiliary device when the auxiliary device is necessary for a movement of the reserved user, after the charging of the robot is completed.

12. The method according to claim 11, wherein determining whether the robot arrives at the destination of the user includes determining whether the robot is located at the destination of the user included in the boarding information.

13. The method according to claim 11, wherein determining whether the robot arrives at the destination of the user includes detecting, by the at least one sensor, the user disembarking from the robot.

14. The method according to claim 11, wherein determining whether the robot arrives at the destination of the user includes receiving an acceptance from the user indicating that the robot has arrived at the destination.

15. The method according to claim 11, wherein charging the robot includes:
moving a plurality of robots including the robot past a power supply coil by moving a moving rail provided in the charging station; and
wirelessly supplying power from the power supply coil to simultaneously charge the plurality of robots.

16. The method according to claim 15, further comprising, while moving the plurality of robots with the moving rail, sterilizing the robots by using a sterilizer installed on upper, opposite sides of the charging station.

17. The method according to claim 16, wherein the sterilizer irradiates ultraviolet rays towards the plurality of robots.

18. The method according to claim 11, further comprising:
prior to moving the robot to the repository or the mounting station, receiving boarding information of the reserved user from the server after the charging of the robot is completed; and
determining, by the processor of the robot, a next destination of the robot according to the boarding information of the reserved user.

19. The method according to claim 18, wherein moving the robot to the repository for a reserved user includes moving the robot by selecting the repository from a plurality of repositories by taking into consideration a reserved place and a reserved time according to the boarding information of the reserved user.

20. The method according to claim 19, wherein moving the robot to the mounting station includes:
receiving, from the server, a number of auxiliary devices stored in the mounting station to which the robot is to move; and
moving the robot to a next mounting station when the number of auxiliary devices at the mounting station is insufficient.

21. The robot charging system according to claim 1, wherein a length of the charging zone of the charging station is determined by taking into consideration of the time required for charging and the speed of the moving rail.

22. The robot charging system according to claim 1, wherein the charging availability information includes at least one of a standby state, currently charging state, and charging completed state of each robot.

* * * * *